April 19, 1960     G. H. PRIMEAU     2,933,354
DRIVE SHAFT BEARING SUPPORT
Filed June 27, 1958
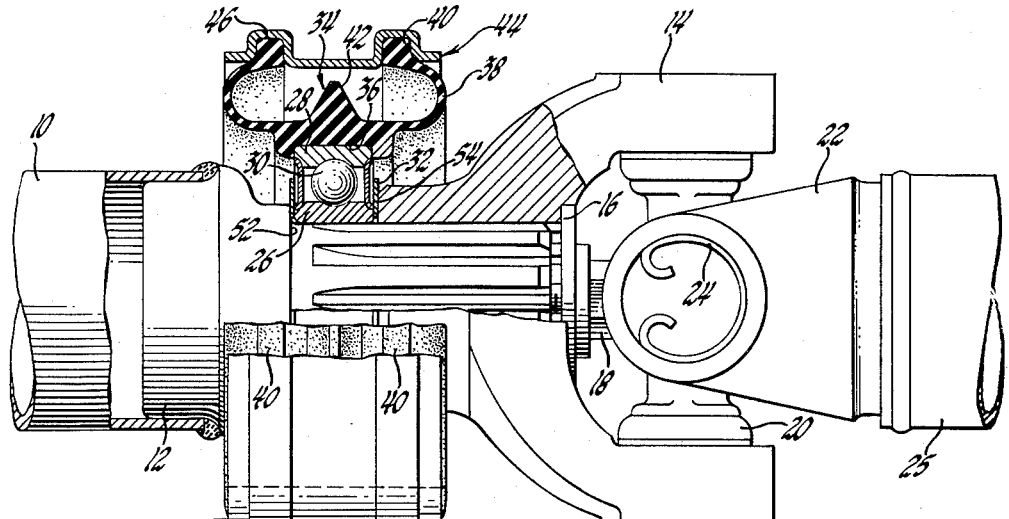
INVENTOR.
George H. Primeau
BY
L. D. Burch
ATTORNEY

United States Patent Office 2,933,354
Patented Apr. 19, 1960

2,933,354

DRIVE SHAFT BEARING SUPPORT

George H. Primeau, Grosse Pointe Farms, Mich., assignor to General Motors Corporation, Detroit, Mich., a corporation of Delaware Application June 27, 1958, Serial No. 745,207

5 Claims. (Cl. 308—184)

This invention relates to drive shaft bearing supports and more particularly to a resilient cushion engaging a drive shaft bearing and secured in a retainer ring to the vehicle frame.

It is necessary, in sectional drive lines in motor vehicles, to provide some sort of center bearing support for the jointed drive shaft. The usual manner of supporting such bearings is to provide a support at the after end of the forward drive shaft section and secure the support to the vehicle frame.

Much difficulty has been had in the past in retaining the resilient mounting member in its proper axial location with respect to the center bearing and with respect to the drive shaft. In the usual construction a resilient mounting is placed between the bearing assembly and the outer tubular drive shaft member, with nothing to retain the resilient member in its proper axial location within the drive tube. In those installations not employing a drive tube, there has been great difficulty in properly retaining the resilient mounting member within a retainer member to prevent slipping and sliding of the resilient member and upsetting the location of the parts.

The device in which this invention is embodied overcomes these objections and provides a drive shaft bearing support that is retained in its proper axial location, yet allowing the normal amount of axial movement of the drive shaft. A resilient cushion member is secured in a retainer ring at its outer periphery and engages the bearing assembly at its inner periphery to prevent the resilient member from slipping out of place.

In the drawings:

Figure 1 is an elevational view of a portion of a vehicle drive line embodying the present invention, with parts broken away and in section to best illustrate the construction.

Figure 2 is a fragmentary sectional view of a portion of the assembly of Figure 1 showing a modification of the retainer ring.

Figure 3 is a view of the portion shown in Figure 2 taken substantially along the line 3—3 of Figure 2.

Figure 4 is a cross sectional view of the resilient cushion and retainer ring of the modification of Figure 2, taken substantially along the line 4—4 of Figure 2, with parts broken away and in section to illustrate the construction.

Referring more particularly to the drawings, a sectional drive line connected by a universal joint is illustrated, with the center bearing support assembly mounted thereon. The forward drive shaft section 10 is welded to a splined member 12, which engages the universal joint section 14, and is retained thereon by the washer 16 and nut 18. A trunnion and bearing assembly 20 is secured in a conventional manner in the universal yoke 14 and is secured in the universal joint section 22 by the retaining rings 24. The universal yoke 22 is suitably secured to the after drive shaft section 25.

A ball bearing assembly, consisting of an inner race 26, an outer race 28, and a plurality of ball members 30, is disposed around the splined portion of the shaft 12. Conventional dirt seal means 32 are employed to prevent road dirt and impurities from getting into the races of the ball bearings and interfering with its operation.

A resilient cushion member, illustrated generally by the numeral 34, is annular in shape and has a groove 36 formed in its inner surface. The outer race 28 of the bearing assembly is received in the groove 36 to prevent axial movement of the resilient cushion with respect to the bearing assembly. A pair of reversely bent thin walled flanges 38 are formed from the main body of the resilient cushion and extend generally outwardly, terminating in the peripheral beads 40. A center annular ridge 42, triangular in section, is formed from the main body of the resilient cushion, and extends radially outwardly to limit the radial movement of the bearing assembly, the drive shaft, and the main body of the resilient cushion.

The resilient cushion member 34 provides a two-rate vibration suppression. A first flexible rate, taken up by the annular thin walled flanges 38, absorbs the normal propeller shaft vibration and normal fore and aft movement of the drive line. A second suppression rate is provided by the pyramidal inner rib 42 which absorbs vibration imparted to the drive line by severe impact or rear axle windup. Thus, the resilient cushion member 36 adapts the drive line to the maximum amount of vibration suppression and under all normal conditions.

A retaining ring, illustrated generally by the numeral 44, surrounds the drive shaft and bearing assembly and is radially spaced therefrom. A pair of annular corrugations, or recesses, 46 are formed from the surface of the retaining ring and receive the peripheral beads 40 formed on the ends of the reversely bent flanges 38.

A bracket member 48 is secured in a suitable manner as by welding to the retaining ring 44. The bracket member is secured also to a vehicle frame member, illustrated by the numeral 50. The configuration of the bracket member 48 where it joins the retaining ring is the same as the retaining ring to prevent axial movement of the retaining ring with respect to the bracket.

The bearing assembly is properly positioned relative to the drive shaft by the shoulder 52 on the splined drive shaft section and by the shoulder 54 formed by the end of the universal yoke 14. The resilient cushion, received about the outer race of the bearing assembly, is properly positioned axially by the annular groove formed therein. The peripheral beads are frictionally held in the retainer ring and axial movement of the retainer ring is prevented by the bracket member 48 which is secured to the frame member 50.

Axial movement of the drive shaft sections, the bearing assembly, and the adjacent portion, or main body of the resilient cushion is possible, to a limited extent, by the flexing of the annular flanges 38 in either direction. Radial movement of the drive shaft portion and the bearing assembly is limited by the annular ridge 42 which contacts the retainer ring when the deflections get too great.

A modification of the retainer ring is shown in Figures 2, 3 and 4. In installations where it is necessary to more completely anchor the peripheral beads of the cushion flanges in the retaining ring, a plurality of tabs 56 may be struck from the central surface of the retaining ring. As shown in Figure 3, the outwardly formed corrugation sections 46 have a lower central portion therebetween. A pair of lateral slots 58 may be cut in this central portion and a joining longitudinal slot 60 may also be cut. The H-shaped opening thus leaves the tabs 56, which may then be bent downwardly and inwardly as illustrated in Figure 3, to retain the peripheral beads 40 in the corrugations. Figure 4 shows a possible location of the tab members, the structure having three sets of tabs equally spaced about the inner periphery of the retainer ring.

I claim:

1. In a motor vehicle, a propeller shaft, bearing means surrounding said shaft, a retaining ring about said bearing means and radially spaced therefrom, resilient cushion means engaging said bearing means, reversely bent flanges extending radially outwardly and formed from said cushion means and terminating in annular beads receivable in said retaining ring, an annular ridge formed from said cushion means between said flanges for preventing excess radial movement of said bearing means and said shaft with respect to said retaining ring, and bracket means secured to said retaining ring and to a vehicle frame member to rigidly hold said retaining ring about said shaft and said bearing means.

2. In a motor vehicle, a propeller shaft, annular bearing means surrounding said shaft, a resilient cushion having an annular groove therein for receiving said bearing means, reversely bent annular flanges extending radially outwardly from said resilient cushion means, said flanges terminating in annular bead portions and forming a bellows section therebetween, a retainer ring having bead receiving recesses formed therein surrounding said resilient cushion and radially spaced therefrom, and a bracket secured to said retainer ring and to a vehicle frame member to prevent movement of said retainer ring with said shaft and said bearing means.

3. A resilient cushion as set forth in claim 2 having a radially outwardly extending annular ridge formed therefrom and between said annular flanges for preventing excessive radial movement of said shaft and said bearing means within said retainer ring.

4. In combination, a shaft, annular bearing means surrounding said shaft, a resilient member disposed about said bearing means and receiving the load on said bearing means, thin walled reversely bent flanges formed from said resilient member and extending radially outwardly therefrom and terminating in peripheral beads, a retaining ring surrounding said resilient member and having annular recesses formed therein for receiving said peripheral beads formed from said resilient member, and a supporting bracket secured to said retaining ring and to a frame member for retaining said retaining ring in position about said shaft and said bearing means and said resilient member.

5. In a resilient member as set forth in claim 4 having a radially outwardly extending annular ridge formed therefrom and between said annular flanges to prevent excessive radial movement of said shaft and said bearing means with respect to said retainer ring.

References Cited in the file of this patent

UNITED STATES PATENTS

| 274,187 | Goubert | Mar. 20, 1883 |
| 2,096,139 | Spahr | Oct. 19, 1937 |
| 2,155,919 | Wooler | Apr. 25, 1939 |